United States Patent Office 3,446,003
Patented May 27, 1969

3,446,003
GLASS FIBER CORD CONSTRUCTION
Robert L. Kolek, Pittsburgh, and Norman G. Bartrug, Allison Park, Pa., assignors to PPG Industries, Inc., a corporation of Pennsylvania
No Drawing. Filed Jan. 3, 1967, Ser. No. 606,549
Int. Cl. D02g 3/18
U.S. Cl. 57—140
20 Claims

ABSTRACT OF THE DISCLOSURE

A multiple ply glass fiber cord having a ply twist that has a lower number of turns per inch than the cord twist and wherein the maximum twist in the cord does not exceed five turns per inch.

---

This invention relates to fibrous cord construction and, more particularly, to glass fiber cord construction used to reinforce elastomeric products such as automotive tires, drive belts, conveyor belts, hosing and the like.

The desirability of the use of glass fibers in the form of twisted cords to reinforce natural and synthetic elastomeric materials is generally well-known. The principal advantages provided by the use of glass fibers as a reinforcement for mechanical rubber goods include: excellent tensile strength, which is unaffected by moisture and temperature up to about 600° F.; excellent dimensional stability; definite elongation characteristics; outstanding resistance to cold flow or yield under stress; and good aging characteristics. However, even though the above represents significant property advantages over existing rubber reinforcements such as cotton, rayon, nylon and polyester, difficulty has been encountered in converting glass fibers into a reinforcement system that will withstand stress conditions encountered in flexing fiber glass reinforced rubber goods. One of the principal conditions that contributes to the inability to make effective use of twisted glass fibers in a reinforcement system is interfilament abrasion during flexing. This interfilamentary abrasion so drastically reduces the flex life of fiber glass reinforcement systems compared to organic fiber reinforcement systems that the use of glass fibers as a reinforcement in mechanical rubber goods has been seriously limited.

Efforts to correct the problem of interfilamentary abrasion and produce an acceptable glass fiber reinforcement included modifications of the glass surfaces with various coatings and chemical treatments. However, all of these previous attempts were unsuccessful in obtaining the fullest use of glass fibers because of the difficulty encountered in preventing the interaction between filaments while at the same time distributing stresses uniformly in the basic filaments as well as from filament to filament in twisted cord reinforcement structures.

Briefly, the present invention provides a means to improve, by modified cord construction, the fatigue resistance or flex life of fiber glass cords used to reinforce elastomeric products. More specifically, the present invention teaches the use of a cord construction having a low ply twist with a higher cord twist to uniformly distribute stresses in the cord and control or substantially reduce the interfilamentary abrasive exhibited by known prior art cord constructions used to reinforce rubber products.

Accordingly, it is an object of this invention to provide an improved fiber reinforced elastomeric system characterized by fiber cord construction having a low ply twist and higher cord twist.

It is a further object of this invention to provide glass fiber elastomeric products that exhibit improved fatigue resistance.

It is also an object of this invention to provide improved fabricated elastomeric products capable of withstanding stress conditions such as are frequently encountered in applications involving belting, tires, tubing, hosing and the like.

The above and other objects and advantages of the present invention will become more apparent when considered in connection with the following detailed description.

In accordance with the present invention, a glass fiber strand or single end was formed by drawing a multitude of fine glass filaments at a high rate of speed from molten cones of glass located at the tips of small orifices in a bushing, such as shown in U.S. Patent No. 2,133,238. During formation, the filaments were coated while moving at a speed of the order of 5,000 to 20,000 feet per minute with a size which contained a binder to give the strand integrity for workability in connection with subsequent textile and reinforcement operation. If the strand does not have proper integrity, fuzzing can occur during these operations, and eventually the strand will break. The size also contained a lubricant for the filaments to prevent destruction of the strand by abrasion of the individual filaments against each other or against fiber handling equipment.

The size employed in connection with the present invention had the following composition:

| Ingredients: | Parts by weight |
|---|---|
| Dow Epoxy Resin 331 | 100.0 |
| Xylene | 10.0 |
| Pluronic F–108 (surface active reaction product of ethylene oxide and propylene glycol) | 5.0 |
| Geigy Amine O | 5.0 |
| Polyvinyl pyrrolidone | 20.0 |
| Acetic acid | 5.0 |
| Glass fiber softener (pelargonic acid amide solubilized in water with acetic acid) | 5.0 |
| Gama-amino-propyl triethoxysilane | 10.0 |
| Water | 1840.0 |

The Dow Epoxy Resin 331, Pluronic F–108 and xylene were mixed together and warmed with stirring to 150° F. The Geigy Amine O was mixed together with 50.0 parts by weight of warm water to which 1.0 part by weight of acetic acid had been added. The Geigy Amine O solution was then slowly added with vigorous agitation to the xylene solution of epoxy resin. An additional 50.0 parts by weight of water was then slowly added followed by the addition of the polyvinyl pyrrolidone dissolved in 50.0 parts by weight of warm water to form an epoxy resin emulsion. The glass fiber softener and the gamma-amino-propyl triethoxysilane were dispersed in 100.0 parts by weight of water followed by the addition of the remaining acetic acid (4.0 parts by weight). The epoxy resin emulsion was then added to the dispersion and sufficient water was added to bring the total weight of the thus constituted sizing composition to 2000.0 parts. Other suitable size materials that may be employed are fully disclosed in U.S. Patent No. 3,252,278.

As is common practice in the production of glass fiber strand, the sized strand was initially wound on a cylindrical forming package. Thereafter, twisted strand (single end on a bobbin) was produced according to conventional textile techniques by removing the strand from the forming package and given it a 0.5 turn twist while winding it on a twister bobbin. The 0.5 turn twist provided further integrity and resistance to fuzzing to the strand and provided a twister strand that was particularly suitable for use in subsequent coating, plying and cording operations.

A plurality of ends of the sized strands hereinabove described were combined and coated and impregnated with an elastomeric adhesive. After coating and impregnating, the ends were twisted and then combined with other like twisted ends to form a coated cord. The elastomeric adhesive employed in the coating operation had the following composition.

A rubber adhesive is prepared from the following ingredients:

| Ingredients: | Parts by weight |
| --- | --- |
| Resorcinol | 352 |
| $CH_2O$ (37%) aqueous solution | 518 |
| NaOH | 9.6 |
| Butadiene-styrene-vinyl pyridine terpolymer latex (Gen–Tac 41% solids dispersed in $H_2O$) | 7800 |
| $NH_4OH$ (28% $NH_3$ in $H_2O$) | 362 |
| $H_2O$ | 9572 |

These ingredients were mixed in the following manner. The Gen–Tac terpolymer latex was mixed with 1940 parts by weight of water. Water (7632 parts by weight) was added to a separate container. NaOH was then added and dissolved in the water in the separate container. Resorcinol was next added to the aqueous solution of NaOH and dissolved therein. Formaldehyde was added after the resorcinol and the mixture was stirred for 5 minutes and allowed to age at room temperature for 2 to 6 hours. The aging permits a small amount of condensation of recorcinol and formaldehyde and provides superior "H" test adhesion of the subsequently coated yarn to the rubber stock. The "H-Adhesion" test is a standard rubber industry test designated as ASTM–D–2138–62T issued in 1964. After aging, this mixture was added to the Gen–Tac latex and the resultant mixture was stirred slowly for 15 minutes. Ammonium hydroxide was then added and the mixture was stirred slowly for 10 minutes. The ammonium hydroxide inhibits further condensation of the resorcinol formaldehyde. Other elastomeric adhesives that may be employed are fully disclosed in U.S. patent application Ser. No. 535,683, filed Mar. 21, 1966.

As a specific example of the above-mentioned operations, conventional 3.5Z x 3.0S glass fiber cord constructions for use in reinforcing rubber products were produced by combining five ends of sized ECG 75's with a 0.5 turn Z twist and coating and impregnating the combined ends with the aforementioned resin latex adhesive. The coated ends were heated to dry the adhesive and cure the resin on the combined ends of yarn. The coated ends were then twisted to impart a 3.5Z singles or ply twist. Thereafter, the twisted ends were combined or twisted with other like twisted ends into a balanced 3.0S cable or cord twist.

The various letters and figures employed above serve to identify the cord construction as well as to give certain information with respect to its physical characteristics. Using ECG–75 5/2 3.5Z x 3.0S as an example, the letter E indicates that the glass in the filaments comprising the basic strand has good electrical properties, C indicates that the filaments are of the continuous length type as distinguished from the staple length type, and the third letter indicates the diameter of the individual filaments, the letter G being used to designate a filament .00038 inch in diameter. The number 75 following the letters ECG indicates the "count" and is $1/100$ of the approximate yardage in one pound of basic strand.

The two numbers separated by a diagonal line following the number 75 in the above example indicate the number of basic strands or single ends in a particular yarn or cord, the number before the diagonal line indicating the number of basic strands twisted together to provide a ply strand, and the number following the diagonal line indicating the number of ply strands which are twisted together to produce the composite cord or cable. Thus, in the example used, five basic strands of ECG-75's were first combined and twisted with a 3.5Z twist to provide a ply strand or twisted end and thereafter two of the aforesaid ply strands or twisted ends were combined and twisted with a 3.0S twist to produce the final composite cord or cable.

Typical cords produced in accordance with the present invention were 5/5, 5/4 and 5/3 for belt reinforcement and 5/3 and 5/2 for tire reinforcement. These cords are frequently used as such, but may also be combined into loosely woven fabric form. A typical use of the loosely woven fabric form is in the belt portion of radial ply tires.

In accordance with the present invention, there is provided cords of a construction characterized by low ply twist with higher cord twist. By virtue of the novel cord construction of the present invention, outstanding improvements have been made in the fatigue resistance or flex life of glass fiber cords over the heretofore standard high ply twist and lower cord twist constructions. These outstanding improvements will become more evident from the examples that follow.

EXAMPLES

Preparation of test specimen

Glass fiber reinforced rubber test specimens were prepared in a steel mold suitably treated with a mold release agent and having a cavity measuring 11 inches long by 8 inches wide by ½ inch deep. Into the mold cavity there was placed a sheet of 50 to 60 mil thick unvulcanized rubber stock cut to fit the mold cavity, followed by lacing in, lengthwise across the rubber surface, a layer of sized and coated cords. This was followed by placing a piece of 2-inch wide duck-woven cotton cloth coated with rubber widthwise across each end of the cord-rubber assembly. The top or cover half of the mold was then placed on the cord-rubber assembly and the test specimen was cured in a suitable press for 25 minutes at 300° F. and 150 p.s.i.g. The temperature and time of cure was determined by the rubber stock, which in this instance had the following composition:

| Ingredients: | SBR-Natural Rubber blend |
| --- | --- |
| SBR 1500 | 75 |
| No. 1 RSS (ribbed smoked sheet) | 25 |
| HAF black | 50 |
| ZnO | 5 |
| Stearic acid | 1 |
| Age-Rite resin (anti-oxidant) | 1 |
| Sundex 790 (plasticizer) | 10 |
| Santocure (accelerator) | 1 |
| DOTG | 0.2 |
| Sulfur | 2.0 |

The chemical identification of the ingredients in the rubber compound can be found in Materials and Compounding Ingredients for Rubber and Plastics, published by Rubber World.

At the end of the cure cycle, the mold was removed from the press and quick-chilled in cold water. The sample pad or test specimen was then removed from the mold and prepared for testing. This test preparation involved cutting ¾-inch wide strips from the sample pad with each ¾-inch by 11-inch strip containing a single layer of nine cords imbedded in one surface. Each strip was of uniform width throughout.

Testing

The sample strips were placed cord side up on both Scott and Firestone flex testing machines, each equipped with ¾-inch hubs. The total load on the sample strips depended on the number of basic strands in a single cord of the particular construction being tested. Thus, while a strandard load of 8 pounds per basic strand was used, this meant that sample strips having 5/2 cord imbedded therein or cord composed of 10 basic strands, as explained more fully hereinabove, were subjected to a total load of 80 pounds. Therefore, sample strips having nine 5/2 cords per strip were subjected to essentially 80÷9 pounds per cord. Similarly, 5/3 cord sample strips were subjected to 120 pounds load, 5/4 cord sample strips to 160 pounds load and so on. Testing was conducted at ambient room temperature of about 70° to 90° F. The testing machines (disclosed in ASTM designation D430–59 and D885–64T, respectively) were run at 250 cycles per minute until specimen failure. The number of cycles to failure was recorded and are reproduced below.

With reference to each of the following examples, conventional balanced cord constructions with high ply-low cord twist are given first and are identified by 3.5Z x 3.0S twist. On the other hand, representative low ply twist and higher cord twist constructions of the present invention are identified by 1.0Z x 2.5S twist and 3.0Z x 5.0S twist, respectively.

The size, the adhesive, the process conditions and the test conditions employed in connection with the following examples were identical in each case. The only variable that was introduced was to change the cord twist construction.

ber-like materials such as chloroprene, butadiene, isoprene and copolymers thereof with acrylonitrile, styrene and isobutylene. The term "elastomer" includes natural and synthetic rubber in the uncured or unvulcanized state as well as in the cured or vulcanized state.

While the term "glass fibers" is preferably employed to define continuous glass fibers as well as strands, yarns, cords and fabrics formed thereof, it is also within the contemplation of this invention to include within this term discontinuous, chopped or otherwise processed glass fibers, as well as strands, yarns, cords and fabrics formed thereof.

What is claimed is:

1. A multiple ply fibrous cord wherein the fibrous cord contains glass fibers, the ply twist of the cord has a lower number of turns per inch than the cord twist and the maximum twist in the cord does not exceed 5 turns per inch.

2. The multiple ply fibrous cord of claim 1 wherein

| Example | Yarn count | Twist Z x S | Flex cycles to failure | Twist Z x S | Flex cycles to failure | Twist Z x S | Flex cycles to failure |
|---------|-----------|-------------|------------------------|-------------|------------------------|-------------|------------------------|
| 1–4 | ECG–75 5/2 | 3.5 x 3.0 | 541,750 | 1.0 x 2.5 | 6,775,000 | 3.0 x 5.0 | 6,400,250 |
| 5–7 | ECG–75 5/3 | 3.5 x 5.0 | 234,750 | 1.0 x 2.5 | 6,408,750 | 3.0 x 5.0 | 7,838,250 |
| 8–10 | ECG–75 5/4 | 3.5 x 3.0 | 337,500 | 1.0 x 2.5 | 3,113,250 | 3.0 x 5.0 | 5,130,250 |
| 11–13 | ECG–75 5/5 | 3.5 x 5.0 | 250,250 | 1.0 x 2.5 | 3,207,250 | 3.0 x 5.0 | 6,000 |

It will be evident from the foregoing that the improved low ply twist-high cord twist glass fiber cord construction of the present invention increased the flex life or fatigue resistance of certain desired glass fiber cords as much as 2500 percent, or 25 times the flex life of conventional 3.5Z x 3.0S cord constructions. On the other hand, the lowest increase in flex life noted was in excess of 800 percent, or 8 times the flex life of the aforementioned conventional cord constructions.

Furthermore, the above test results illustrate, by way of representative examples, that for glass fiber cord in the range of 3750 yards per pound to 750 yards per pound, the optimum twist for improved flex life is up to 3 turns per inch ply twist and up to 5 turns per inch cord twist. Similarly, for glass fiber cord in the range of 750 yards per pound to 300 yards per pound, the optimum twist for improved flex life is up to 2 turns per inch ply twist and up to 3.5 turns per inch cord twist.

Examples 11 through 13 serve to dramatically illustrate the criticality of not exceeding the above limits of twist. In Example 13 an ECG–75 5/3 3.0Z x 5.0S cord construction, when tested for flex life, failed after only 6,000 cycles. The reason for this low flex life was a combination of the excessive twist and the high bulk in this cord and consequent excessive abrading and breakage of the elementary filaments of the cord during flexing. Thus, this example illustrates that for glass fiber cord of 300 yards per pound, the critical twist or critical angle of twist is exceeded with a 3.0Z x 5.0S twist construction. On the other hand, identical cord with a twist construction within the aforementioned optimum range is shown, by a comparison of Examples 11 through 13, to give greatly improved flex life results.

It should also be appreciated from the foregoing that for cords having improved flex life, the cord twist should generally be less than 3 times the ply twist. In addition, the above test results verified previous experience indicating that 5 turns per inch is the upper limit of twist that can be tolerated with glass fibers without seriously limiting the strength of strands, yarns, cords and fabrics formed therefrom.

The term "elastomer" as used herein and in the claims is intended to include elastic substances such as natural latex from the Hevea tree and synthetic rubber and rubber-like materials. It also includes natural and synthetic rubber and rubber-like materials which have been chemically modified such as by chlorination to improve their physical properties. Synthetic rubber includes rubthe ply twist is opposite in direction to that of the cord twist.

3. The multiple ply fibrous cord of claim 2 wherein the cord twist is not more than about 3 times the ply twist.

4. Elastomeric material reinforced with multiple ply fibrous cord as described in claim 1.

5. The elastomeric material of claim 4 wherein the ply twist is 1.0 turn per inch and the cord twist is 2.5 turns per inch.

6. The elastomeric material of claim 4 wherein the ply twist is 3.0 turns per inch and the cord twist is 5.0 turns per inch.

7. A multiple ply fibrous cord for elastomer reinforcement comprising glass fiber cord in the range of 3750 yards per pound to 750 yards per pound, said glass fiber cord having a ply twist of up to 3 turns per inch and a cord twist of up to 5 turns per inch and wherein the ply twist has a lower number of turns per inch than the cord twist.

8. The multiple ply fibrous cord of claim 7 wherein the ply twist is opposite in direction to that of the cord twist.

9. The multiple ply fibrous cord of claim 8 wherein the cord twist is not more than about 3 times the ply twist.

10. Elastomeric material reinforced with multiple ply fibrous cord as described in claim 7.

11. A multiple ply fibrous cord for elastomer reinforcement comprising glass fiber cord in the range of 750 yards per pound to 300 yards per pound, said glass fiber cord having a ply twist of up to 2 turns per inch and a cord twist of up to 3.5 turns per inch and wherein the ply twist has a lower number of turns per inch than the cord twist.

12. The multiple ply fibrous cord of claim 11 wherein the ply twist is opposite in direction to that of the cord twist.

13. The multiple ply fibrous cord of claim 12 wherein the cord twist is not more than about 3 times the ply twist.

14. Elastomeric material reinforced with multiple ply fibrous cord as described in claim 11.

15. A multiple ply fibrous cord comprising elastomer coated glass fiber strand having a ply twist that has a lower number of turns per inch than the cord twist and wherein the maximum twist in the cord does not exceed 5 turns per inch.

16. The multiple ply fibrous cord of claim 15 wherein the glass fiber strand is sized.

17. The multiple ply fibrous cord of claim 16 wherein the ply twist is opposite in direction to that of the cord twist.

18. The multiple ply fibrous cord of claim 17 wherein the cord twist is not more than about 3 times the ply twist.

19. The multiple ply fibrous cord of claim 18 wherein the elastomer coating is butadiene-styrene-vinyl pyridine terpolymer.

20. The multiple ply fibrous cord of claim 19 wherein the elastomer coating contains a heat curable resin and the heat curable resin is resorcinol formaldehyde.

References Cited

UNITED STATES PATENTS

| | | | |
|---|---|---|---|
| 2,799,598 | 7/1957 | Biefeld et al. | |
| 2,800,761 | 7/1957 | Owens | 57—35 |
| 2,842,932 | 7/1958 | Owens | 57—35 |
| 2,903,779 | 9/1959 | Owens | 57—140 |
| 2,930,105 | 3/1960 | Budd. | |
| 2,958,114 | 11/1960 | Marzocchi et al. | |
| 3,029,590 | 4/1962 | Caroselli et al. | 57—153 |
| 3,066,383 | 12/1962 | Marzocchi et al. | 57—153 X |
| 3,079,664 | 3/1963 | Grant. | |
| 3,252,278 | 5/1966 | Marzocchi et al. | 57—153 |

JOHN PETRAKES, *Primary Examiner.*

U.S. Cl. X.R.

57—153, 157, 164